O. M. LAMSENS.
PROCESS OF CHARGING BEER.
APPLICATION FILED MAY 20, 1912.
1,137,149.
Patented Apr. 27, 1915.
2 SHEETS—SHEET 1.
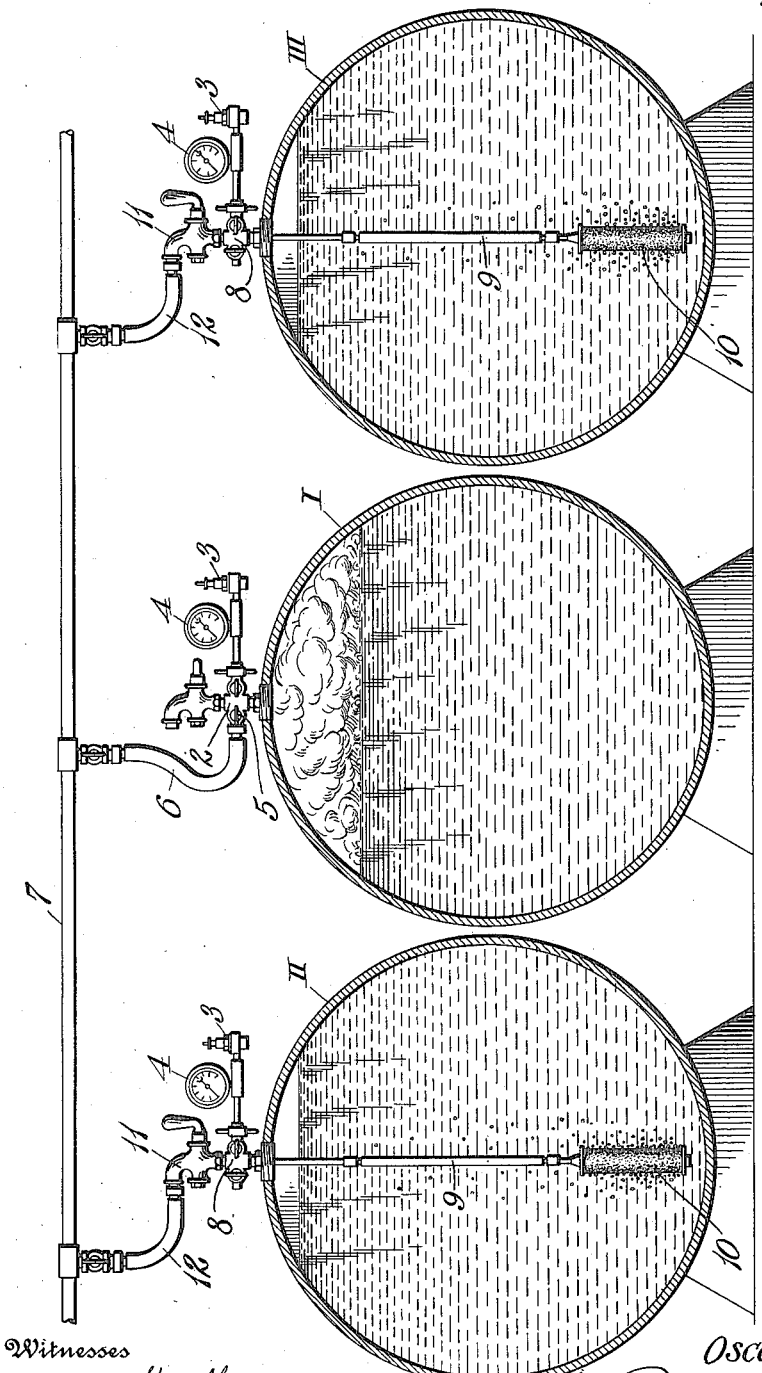

O. M. LAMSENS.
PROCESS OF CHARGING BEER.
APPLICATION FILED MAY 20, 1912.
1,137,149.
Patented Apr. 27, 1915.
2 SHEETS—SHEET 2.
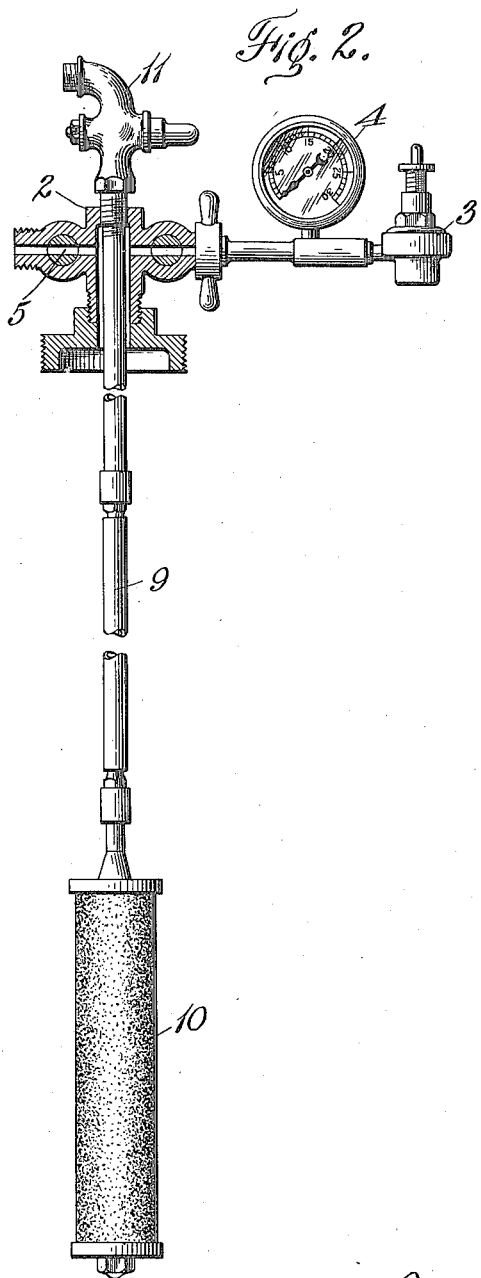
Witnesses
Chas. W. Stauffiger
Anna M. Dorr.
Inventor
Oscar M. Lamsens,
Attorneys

UNITED STATES PATENT OFFICE.

OSCAR M. LAMSENS, OF DETROIT, MICHIGAN.

PROCESS OF CHARGING BEER.

1,137,149.

Specification of Letters Patent. Patented Apr. 27, 1915.

Application filed May 20, 1912. Serial No. 698,582.

*To all whom it may concern:*

Be it known that I, OSCAR M. LAMSENS, a citizen of the United States of America, residing at Detroit, in the county of Wayne and State of Michigan, have invented certain new and useful Improvements in Processes of Charging Beer, of which the following is a specification, reference being had therein to the accompanying drawings.

In carbonating or charging beer the amount of gas absorbed depends not only upon the pressure and temperature of the beer and its chemical properties, the latter being substantially constant in any one certain beer, but also upon the physical condition of the beer, that is, upon the degree of rest or motion among the particles comprising the whole body of beer under treatment. Thus the beer may be in a quiescent or gently agitated state or in a violently disturbed condition during the process of charging. This physical condition during this time is largely the result of the method of charging. The degree of saturation, other conditions being equal, varies inversely with the extent or amount of agitation during the charging process. The facility with which the absorption is accomplished is effected largely by the amount of contact surface between the liquid and gas, or upon the degree of intimacy with which they may be commingled. The more minute the particles into which the bodies or one of them is divided, the greater is the area of contacting surfaces. This last fact has long been utilized in the usual processes for charging beer whereby the latter is finely divided into spray and passed through or introduced into the charging gas. This process of charging, besides being more or less uncertain in its results requires an expensive apparatus, the operation of which is attended by expense for labor, maintenance and investment of considerable capital. Furthermore, this operation subjects the beer to most violent agitation in which condition it is least adapted to be saturated with gas. As the desired degree of saturation in a body of beer must be attained by such process in the comparatively short time consumed in moving the beer from one tank to another, the amount of gas absorbed during this time, is far greater than that which is given off by the fermenting or krausen beer during the same time, and thus, if the gases of fermentation are to be used, the latter must be collected as given off and stored under pressure, and then, when a sufficient supply is had, must be forced into the still beer while the latter is being pumped from one tank to another or into the racking-off package, either by means of an inspirator or by spraying the still beer through an atmosphere of the gas or through a column of gas moving in the opposite direction to the flow of the beer. Thus the gases of fermentation together with the volatile, aromatic ethers and oils which make up the aroma or flavor of the beer are not forced into the still beer in a nascent condition. Consequently the bouquet is lost and a certain liquid of condensation, which is very deleterious in its effect upon the beer, results, which may be carried over into the beer and if so, imparts thereto a very distinct and disagreeable odor.

Where the brewing is conducted on a large scale the charging in the ordinary way not only consumes time but necessitates the expense of pumping or otherwise moving large quantities of beer and also compels proper safety appliances to prevent overcharging and consequent explosions, a not unfrequent occurrence in breweries.

It has frequently been the custom to also impregnate the beer with the gases of fermentation from beer in the green or krausen stage. This has been done by introducing a certain amount or proportion of green or krausen beer directly into the still beer, and confining the commingled liquids until the entire body is charged. This makes the beer cloudy and necessitates refiltering.

This invention relates to a process of charging beer whereby the necessity of moving or pumping large quantities of still beer is obviated whereby danger from explosion is avoided and whereby the gases of fermenting beer, together with the ethers and volatile oils are directly introduced into still beer while they are nascent, so that the full aroma and other desirable qualities of such gases and concomitants are fully preserved and the quality of the charged beer greatly enhanced thereby. The invention also includes means for carrying out this process whereby the beer is charged automatically without the use of compressors, charging tanks or the like, and whereby any closed receptacle in which the beer may be momentarily placed for settling is utilized for charging, provided of course, that such receptacle be so constructed as to stand the necessary pressure. The process is also conducted without disturbing the beer, which is thus in best condition for thorough saturation.

The invention consists in the matters hereinafter set forth and more particularly pointed out in the appended claims.

In the drawings, Figure 1 is a view largely diagrammatic and in elevation, showing a charging and storage system whereby the process that involves the invention may be readily carried out; and Fig. 2 is a view in detail of a portion of the apparatus.

Referring to the drawings a series of tanks 1, 2 and 3, for example, are arranged in the usual manner for storing and settling beer. The tank 1 may be filled with fermenting or krausen beer while the remaining tanks, which may be chip casks or settling vats, are filled with fully fermented still beer. A suitable fitting 2 introduced in the top of the tank 1 is provided with a safety blow-off valve 3 of any preferred type and a gage 4 for indicating the pressure. A controlling valve 5 is adapted to receive a flexible pressure hose 6 or like connection whereby the gases of fermentation from the tank may be led to any convenient pipe line 7 or the like.

A fitting 8 corresponding to the fitting 2 is introduced into the upper portion of each of the other tanks and is adapted when open to allow the admission of a pipe or tube 9 terminating in a charging nozzle 10. The latter is preferably in the form of a hollow cylinder connected to the pipe 9 at its inner end and closed at the outer end, the wall of the cylinder being porous to allow gas entering the cylinder under pressure to escape therefrom in fine bubbles. At the upper end a valve 11 is secured to the pipe 9 for controlling flow through the latter and a flexible connection 12 is used to couple the valve with the pump pipe 7.

It is to be understood that the pipe 7 or a pipe system represented by the pie 7 is extended through the brewery in such manner that the charging nozzles may be connected thereto at any convenient point and introduced into any tank in which still beer is stored. It is also to be understood that where the tanks are of considerable length two or more of these nozzles may be introduced at intervals if desired.

In operation, the gases of the fermenting or krausen beer are allowed to accumulate until a predetermined natural head or pressure is reached in the fermenting tank sufficient to drive the gases into the liquor to be charged, and thereafter they are directed through the pipe system and nozzles into the tanks of still beer wherever they may be and the charging nozzles so finely disseminate the escaping gases through the beer in which the nozzles are submerged that the liquid becomes evenly charged up to its limit of absorption, any excess escaping through a suitably disposed relief valve in the tank. One result of this method is the even charging of large quantities of beer without the necessity of moving the beer or of placing it in especially prepared tanks or casks. Another result is the fact that the full aroma or bouquet of the fermenting beer is preserved as the gases are not subjected to artificial compression and are not unduly agitated as is the case where they pass through a mechanical compressor and consequently are liberated into the still beer while they and the accompanying aromatic ethers and oils are nascent, thereby imparting to the still beer the full flavor and aroma of the fermenting beer, and preventing the disagreeable odors and taste which are the results of allowing the gases and concomitants to be condensed or compressed. Another feature is the simplicity of the apparatus for carrying out the process which may be attached to the ordinary brewery system without the addition of costly apparatus, the main feature of the expense being the installation of the proper distributing pipes to which may be added the slight cost of the charging nozzles. The latter do not *per se* form a feature of this invention and are not particularly described or claimed herein further than as nozzles adapted to introduce gas in a finely divided state into the liquid in which the nozzles are submerged.

Obviously, changes in the details of construction may be made without departing from the spirit of the invention and I do not care to limit myself to any particular form or arrangement of parts.

I claim:—

1. The process of charging beer which consists in introducing the gases, ethers and other like concomitants given off by beer confined in the fermenting tanks ordinarily used in the process of brewing into still beer while the latter is confined in the chip or settling tanks used ordinarily in brewing process in such manner that the gases, ethers and other concomitants are forced by the natural pressure of fermentation in the fermenting tank and are very finely divided and diffused throughout the body of the still beer at the point of introduction thereto into the body of still beer.

2. The process of charging beer during the brewing thereof by utilization of the various fermenting, settling and chip casks in which the beer is confined at times during the brewing which consist in forcing by the natural pressure of fermentation the gases, ether and other concomitants given off by the working beer confined in any of the fermenting tanks into the still beer confined in any of the settling and chip tanks and casks and in finely dividing and diffusing the gases, ethers and other concomitants at the point of liberation into the body of the still beer whereby the beer becomes charged to the point of saturation thereby.

In testimony whereof I affix my signature in presence of two witnesses.

OSCAR M. LAMSENS.

Witnesses:
 ANNA M. DORR,
 CHAS. W. STAUFFIGER.